United States Patent
Yang et al.

(10) Patent No.: US 12,034,381 B2
(45) Date of Patent: Jul. 9, 2024

(54) BIDIRECTIONAL DC-AC CONVERSION CIRCUIT AND A STARTING METHOD THEREOF

(71) Applicant: SANTAK ELECTRONIC (SHENZHEN) CO., LTD., Shenzhen (CN)

(72) Inventors: Yue Yang, Shenzhen (CN); Dengke Zhang, Shenzhen (CN); Yulong Hao, Shenzhen (CN)

(73) Assignee: Santak Electronic (Shenzhen) Co., Ltd, Guangdong (CN)

( * ) Notice: Subject to any disclaimer, the term of this patent is extended or adjusted under 35 U.S.C. 154(b) by 0 days.

(21) Appl. No.: 17/655,086

(22) Filed: Mar. 16, 2022

(65) Prior Publication Data
US 2022/0302853 A1 Sep. 22, 2022

(30) Foreign Application Priority Data
Mar. 17, 2021 (CN) .................. 202110285477.9

(51) Int. Cl.
*H02M 7/5395* (2006.01)
*H02M 1/36* (2007.01)
*H02M 3/335* (2006.01)
*H02M 7/487* (2007.01)
*H02M 7/797* (2006.01)

(52) U.S. Cl.
CPC .......... *H02M 7/5395* (2013.01); *H02M 1/36* (2013.01); *H02M 3/33584* (2013.01); *H02M 7/487* (2013.01); *H02M 7/797* (2013.01)

(58) Field of Classification Search
CPC .. H02M 7/5395; H02M 1/36; H02M 3/33584; H02M 7/487; H02M 7/797; H02M 1/32
See application file for complete search history.

(56) References Cited

U.S. PATENT DOCUMENTS

| | | | | |
|---|---|---|---|---|
| 7,098,558 B2* | 8/2006 | Okuma | .................... | H02J 9/062 307/66 |
| 8,963,616 B2* | 2/2015 | Degener | ............... | H02M 7/487 327/434 |
| 9,106,074 B2* | 8/2015 | Takizawa | ................ | H02M 1/36 |
| 9,413,268 B2* | 8/2016 | Fu | .............. | H02J 3/38 |
| 10,243,455 B2* | 3/2019 | Zheng | ..................... | H02M 3/07 |
| 10,547,251 B1* | 1/2020 | Pan | ......................... | H02M 1/36 |
| 11,218,086 B2* | 1/2022 | Liu | ............................ | H02P 6/08 |
| 2011/0298427 A1* | 12/2011 | Uemura | ............... | H01M 10/66 320/134 |

(Continued)

*Primary Examiner* — Yusef A Ahmed
(74) *Attorney, Agent, or Firm* — Stanek Lemon Crouse & Meeks, PA

(57) ABSTRACT

A converter includes a bidirectional DC-AC converter circuit, an input capacitor connected to an AC input of the bidirectional DC-AC converter, a bus capacitor connected to a DC output of the bidirectional DC-AC converter circuit, a switch connected between a positive terminal of the input capacitor and an AC power supply, a pre-charger having an input connected to the AC power supply and an output connected to the DC output of the bidirectional DC-AC converter circuit, and a controller configured to convert the voltage across the bus capacitor into an inverting voltage and apply the inverting voltage to the input capacitor before turning on the switch.

8 Claims, 6 Drawing Sheets

(56) References Cited

U.S. PATENT DOCUMENTS

| | | | | |
|---|---|---|---|---|
| 2013/0107599 | A1* | 5/2013 | Shekhawat | H02M 7/487 |
| | | | | 363/131 |
| 2014/0145694 | A1* | 5/2014 | Ishigaki | B60L 50/51 |
| | | | | 323/271 |
| 2015/0108958 | A1* | 4/2015 | Xu | H02M 3/155 |
| | | | | 323/282 |
| 2015/0180279 | A1* | 6/2015 | Nielsen | H02M 1/126 |
| | | | | 307/64 |
| 2016/0043659 | A1* | 2/2016 | Xu | H02M 1/088 |
| | | | | 363/131 |
| 2016/0072406 | A1* | 3/2016 | Sato | H02M 7/537 |
| | | | | 363/131 |
| 2016/0268924 | A1* | 9/2016 | Fu | H02M 7/483 |
| 2016/0285388 | A1* | 9/2016 | Alexander | H01L 29/747 |
| 2017/0187304 | A1* | 6/2017 | Fujii | H02M 7/003 |
| 2017/0237359 | A1* | 8/2017 | Ohnishi | H02J 9/062 |
| | | | | 363/131 |
| 2017/0244334 | A1* | 8/2017 | Ohnishi | H02M 1/08 |
| 2017/0250533 | A1* | 8/2017 | de Jesus Cardoso Filho | |
| | | | | H02M 1/007 |
| 2018/0219492 | A1* | 8/2018 | Shi | H02M 7/5387 |
| 2018/0278158 | A1* | 9/2018 | Zheng | H02M 3/158 |
| 2019/0052177 | A1* | 2/2019 | Lu | H02M 7/217 |
| 2019/0058414 | A1* | 2/2019 | Ohnishi | H02M 7/487 |
| 2019/0140555 | A1* | 5/2019 | Chen | H02M 1/34 |
| 2019/0238062 | A1* | 8/2019 | Lu | H03K 17/602 |
| 2020/0220466 | A1* | 7/2020 | Backman | H02M 3/33523 |
| 2022/0311330 | A1* | 9/2022 | Lu | H02M 7/487 |
| 2023/0238895 | A1* | 7/2023 | Moon | H02M 7/487 |
| | | | | 363/40 |

* cited by examiner

BIDIRECTIONAL DC-AC CONVERSION CIRCUIT AND A STARTING METHOD THEREOF

CROSS-REFERENCE TO RELATED APPLICATIONS

The present application claims priority to Chinese Patent Application No. 202110285477.9; Filed Mar. 17, 2021, entitled A BIDIRECTIONAL DC-AC CONVERSION CIRCUIT AND A STARTING METHOD THEREOF that is incorporated herein by reference in its entirety.

TECHNICAL FIELD

The present invention relates to the field of converters, and in particular to a bidirectional DC-AC conversion circuit and a starting method thereof.

BACKGROUND ART

FIG. 1 is a circuit diagram of an AC-DC conversion circuit in the prior art. As shown in FIG. 1, the AC-DC conversion circuit 10 includes an AC-DC converter 11, an input capacitor C11 connected to an AC input of the AC-DC converter 11, a bus capacitor C12 connected to a DC output of the AC-DC converter 11, and a pre-charger 12, the input of which is connected to the AC power supply Vi, and the output of which is connected to two ends of the bus capacitor C12. The AC power supply Vi is connected to an AC input of the AC-DC converter through a switch K11, and the AC-DC converter 11 is configured to rectify the alternating current of the AC power supply Vi into direct current and store it on the bus capacitor C12.

When the AC-DC conversion circuit 10 is started, a control device (not shown in FIG. 1) controls the switch K11 to be in an off state, and controls the pre-charger 12 to charge the bus capacitor C12, so that the voltage on the bus capacitor C12 is equal to the peak-to-peak value voltage of the alternating current of the AC power supply Vi; the switch K11 is then controlled to turn on.

However, at the moment when the switch K11 is conductive, the voltage across the input capacitor C11 is zero. At this time, the alternating current of the AC power supply Vi is directly applied across the input capacitor C11 via the conductive switch K11, so that there is a very large inrush current in the input capacitor C11, and the switch K11 and the input capacitor C11 are easily damaged.

SUMMARY OF THE INVENTION

In view of the above technical problem existing in the prior art, the present invention provides a bidirectional DC-AC conversion circuit, comprising:
- a bidirectional DC-AC converter;
- an input capacitor connected to an AC input of the bidirectional DC-AC converter;
- a bus capacitor connected to a DC output of the bidirectional DC-AC converter;
- a switch connected between a positive terminal of the input capacitor and an AC power supply;
- a pre-charger, having an input connected to the AC power supply, and an output connected to the DC output of the bidirectional DC-AC converter; and
- a controller configured to convert a voltage across the bus capacitor into an inverting voltage and output it to the input capacitor before controlling the switch to turn on.

Preferably, the controller is configured to control the switch to turn off and to control the pre-charger to work to charge the bus capacitor; and also configured to control the bidirectional DC-AC converter to work to convert the voltage across the bus capacitor into an inverting voltage, a phase of the inverting voltage being the same as the phase of an alternating current of the AC power supply.

Preferably, the voltage of the bus capacitor is no less than a peak-to-peak value of the alternating current of the AC power supply, and the amplitude of the inverting voltage is equal to the amplitude of the alternating current of the AC power supply.

Preferably, the bus capacitor comprises a positive direct current bus capacitor and a negative direct current bus capacitor, and a negative terminal of the positive direct current bus capacitor and a positive terminal of the negative direct current bus capacitor are connected to a neutral point; the bidirectional DC-AC converter is a three-level converter, and a DC output of the three-level converter is connected to the positive terminal of a positive direct current bus capacitor and the negative terminal of a negative direct current bus capacitor; wherein the controller is configured to control the pre-charger to work so that the voltage across the positive direct current bus capacitor or negative direct current bus capacitor is equal to the amplitude of the alternating current; and also configured to control the bidirectional DC-AC converter to work so that the phase and amplitude of the inverting voltage are equal to the phase and amplitude of the alternating current, respectively.

Preferably, the three-level converter is a T-type three-level converter comprising: a first switching transistor and a fourth switching transistor which are successively connected between the positive terminal of the positive direct current bus capacitor and the negative terminal of the negative direct current bus capacitor, a second switching transistor and a third switching transistor connected in series in an opposite direction, the second switching transistor being connected to the neutral point, and an inductor, having one end connected to a node formed by connecting the first switching transistor, the third switching transistor, and the fourth switching transistor, and the other end used as an AC input of the T-type three-level converter; wherein the controller is configured to control the second switching transistor to turn on and the fourth switching transistor to cut off in a positive half cycle of the alternating current, providing a first sinusoidal pulse width modulated signal to the first switching transistor, and providing a sinusoidal pulse width modulated signal complementary to the first sinusoidal pulse width modulated signal to the third switching transistor; and, in a negative half cycle of the alternating current, to control the first switching transistor to cut off and the third switching transistor to turn on, providing a second sinusoidal pulse width modulated signal to the fourth switching transistor, and providing a sinusoidal pulse width modulated signal complementary to the second sinusoidal pulse width modulated signal to the second switching transistor.

Preferably, the three-level converter is an I-type three-level converter comprising: a first switching transistor, a second switching transistor, a third switching transistor, and a fourth switching transistor which are successively connected between the positive terminal of the positive direct current bus capacitor and the negative terminal of the negative direct current bus capacitor; a first diode, having a negative electrode connected to a node formed by connecting the first switching transistor and the second switching transistor, and a positive electrode connected to the neutral point; a second diode, having a negative electrode connected to the neutral point, and a positive electrode connected to a node formed by connecting the third switching transistor and the fourth switching transistor; and an inductor, having one end connected to a node formed by connecting the second switching transistor and the third switching transistor, and the other end used as the AC input of the I-type three-level converter; wherein the controller is configured to control the second switching transistor to turn on and the fourth switching transistor to cut off in a positive half cycle of the alternating current, providing a first sinusoidal pulse width modulated signal to the first switching transistor, and providing a sinusoidal pulse width modulated signal complementary to the first sinusoidal pulse width modulated signal to the third switching transistor; and, in a negative half cycle of the alternating current, to control the first switching transistor to cut off and the third switching transistor to turn on, providing a second sinusoidal pulse width modulated signal to the fourth switching transistor, and providing a sinusoidal pulse width modulated signal complementary to the second sinusoidal pulse width modulated signal to the second switching transistor.

The present invention also provides a starting method for the bidirectional DC-AC conversion circuit, comprising converting the voltage across the bus capacitor into an inverting voltage and outputting it to the input capacitor and then controlling the switch to turn on.

Preferably, the starting method comprises steps as follows: step 1), the switch is controlled to turn off and the pre-charger is controlled to work to charge the bus capacitor; step 2), the bidirectional DC-AC converter is controlled to work to convert the voltage across the bus capacitor into an inverting voltage, the phase of the inverting voltage being the same as the phase of an alternating current of the AC power supply. and step 3), the switch is controlled to turn on.

Preferably, the voltage of the bus capacitor is no less than a peak-to-peak value of the alternating current of the AC power supply, and the amplitude of the inverting voltage is equal to the amplitude of the alternating current.

Preferably, the bus capacitor comprises a positive direct current bus capacitor and a negative direct current bus capacitor, and a negative terminal of the positive direct current bus capacitor and a positive terminal of the negative direct current bus capacitor are connected to a neutral point; the bidirectional DC-AC converter is a three-level converter, and a DC output of the three-level converter is connected to a positive terminal of the positive direct current bus capacitor and a negative terminal of the negative direct current bus capacitor; wherein in step 1), the voltage across the positive direct current bus capacitor or the negative direct current bus capacitor is made equal to the amplitude of the alternating current; and in step 2), the phase and amplitude of the inverting voltage are made equal to the phase and amplitude of the alternating current, respectively.

Preferably, the three-level converter is a T-type three-level converter comprising: a first switching transistor and a fourth switching transistor which are successively connected between the positive terminal of the positive direct current bus capacitor and the negative terminal of the negative direct current bus capacitor, a second switching transistor and a third switching transistor connected in series in an opposite direction, the second switching transistor being connected to the neutral point, and an inductor, having one end connected to a node formed by connecting the first switching transistor, the third switching transistor, and the fourth switching transistor, and the other end used as an AC input of the T-type three-level converter; wherein the step 2) comprises: in a positive half cycle of the alternating current, the second switching transistor is controlled to turn on and the fourth switching transistor is controlled to cut off, providing a first sinusoidal pulse width modulated signal to the first switching transistor, and providing a sinusoidal pulse width modulated signal complementary to the first sinusoidal pulse width modulated signal to the third switching transistor; in a negative half cycle of the alternating current, the first switching transistor is controlled to cut off and the third switching transistor is controlled to turn on, providing a second sinusoidal pulse width modulated signal to the fourth switching transistor, and providing a sinusoidal pulse width modulated signal complementary to the second sinusoidal pulse width modulated signal to the second switching transistor.

Preferably, the three-level converter is an I-type three-level converter comprising: a first switching transistor, a second switching transistor, a third switching transistor, and a fourth switching transistor which are successively connected between the positive terminal of the positive direct current bus capacitor and the negative terminal of the negative direct current bus capacitor; a first diode, having a negative electrode connected to a node formed by connecting the first switching transistor and the second switching transistor, and a positive electrode connected to the neutral point; a second diode, having a negative electrode connected to the neutral point, and a positive electrode connected to a node formed by connecting the third switching transistor and the fourth switching transistor; and an inductor, having one end connected to a node formed by connecting the second switching transistor and the third switching transistor, and the other end used as the AC input of the I-type three-level converter; wherein the step 2) comprises: in a positive half cycle of the alternating current, the second switching transistor is controlled to turn on and the fourth switching transistor is controlled to cut off, providing a first sinusoidal pulse width modulated signal to the first switching transistor, and providing a sinusoidal pulse width modulated signal complementary to the first sinusoidal pulse width modulated signal to the third switching transistor; in a negative half cycle of the alternating current, the first switching transistor is controlled to cut off and the third switching transistor is controlled to turn on, providing a second sinusoidal pulse width modulated signal to the fourth switching transistor, and providing a sinusoidal pulse width modulated signal complementary to the second sinusoidal pulse width modulated signal to the second switching transistor.

The bidirectional DC-AC conversion circuit of the present invention can reduce or avoid the generation of inrush current in the input capacitor, avoiding damage to the switch and the input capacitor.

BRIEF DESCRIPTION OF THE DRAWINGS

Embodiments of the present invention are further described below with reference to the accompanying drawings, in which.

DETAILED DESCRIPTION OF THE INVENTION

In order to make the object, technical solutions, and advantages of the present invention more apparent, a more particular description of the present invention will be rendered below by specific embodiments with reference to the accompanying drawings.

Figure 1:
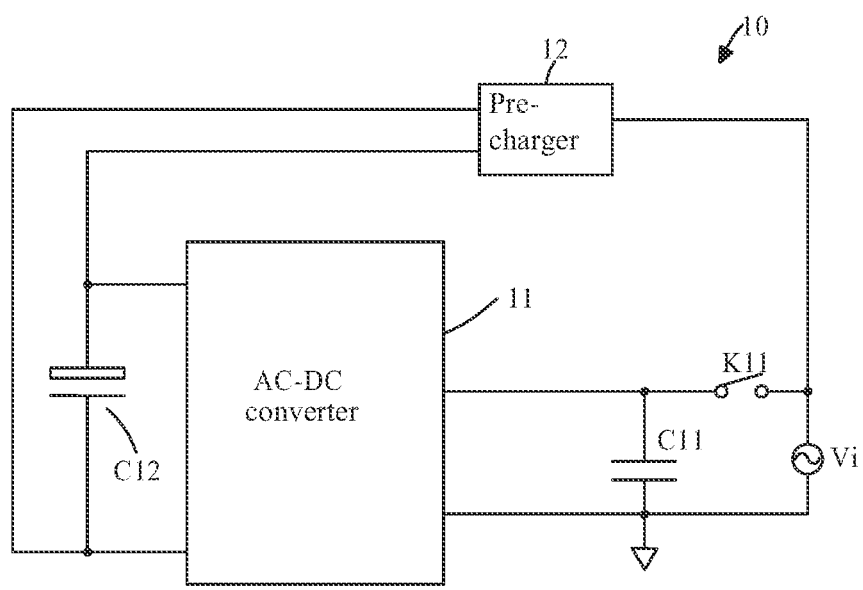
FIG. 1 is a circuit diagram of an AC-DC conversion circuit in the prior art.
Figure 2:
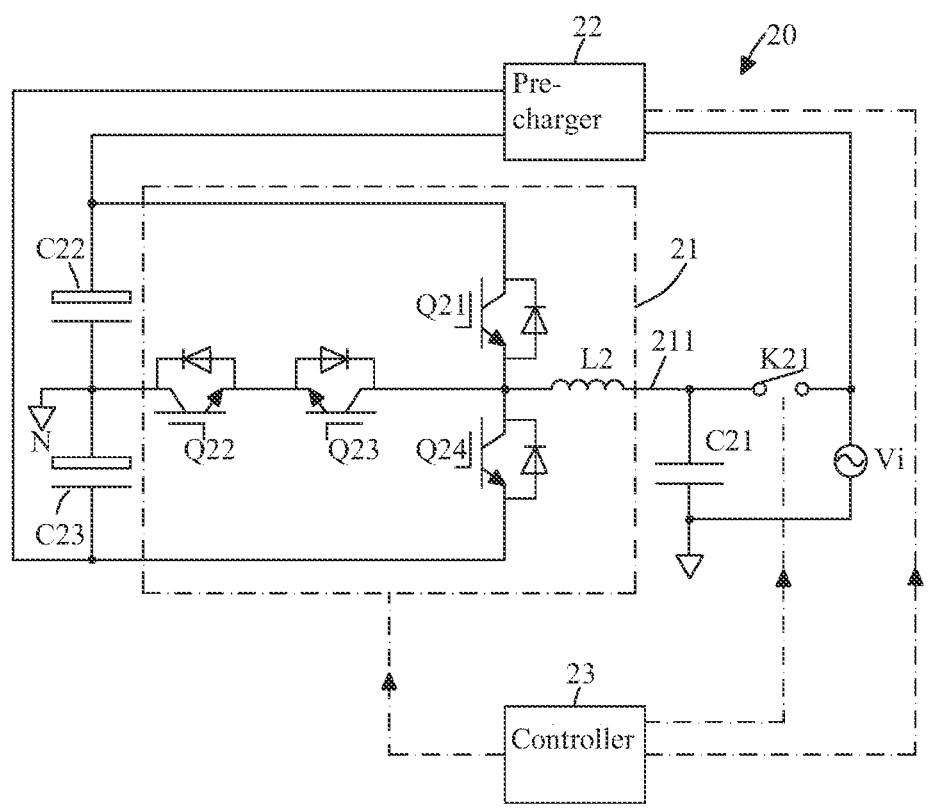
FIG. 2 is a circuit diagram of a bidirectional DC-AC conversion circuit according to a first embodiment of the present invention.

FIG. 2 is a circuit diagram of a bidirectional DC-AC conversion circuit according to a first embodiment of the present invention. As shown in FIG. 2, the bidirectional DC-AC conversion circuit 20 includes a T-type three-level converter 21, a pre-charger 22, a switch K21, an input capacitor C21, a positive DC bus capacitor C22, a negative DC bus capacitor C23, and a controller 23 for controlling the T-type three-level converter 21, the pre-charger 22, and the switch K21.

The input of the pre-charger 22 is connected to the AC power supply Vi, and the output of the pre-charger 22 is connected to the positive terminal of the positive DC bus capacitor C22 and the negative terminal of the negative DC bus capacitor C23. The negative terminal of the positive DC bus capacitor C22 and the positive terminal of the negative DC bus capacitor C23 are connected to a neutral point N.

The T-type three-level converter 21 comprises switching transistors Q21, Q22, Q23, and Q24 and an inductor L2. The switching transistors Q21 and Q24 are successively connected between the positive terminal of the positive DC bus capacitor C22 and the negative terminal of the negative DC bus capacitor C23, and the switching transistors Q22 and Q23 are connected in series in an opposite direction between the neutral point N and a node formed by the connection of the switching transistors Q21 and Q24. One end of the inductor L2 is connected to the node formed by the connection of the switching transistors Q21, Q23, and Q24, and the other end serves as an AC input 211.

The input capacitor C21 is connected to the AC input 211 of the T-type three-level converter 21, and the switch K21 is connected between the AC input 211 of the T-type three-level converter 21 and the AC power supply Vi.

The start-up procedure of the bidirectional DC-AC conversion circuit 20 will be described below.

In step S21, the controller 23 controls the switch K21 to turn off, and controls the pre-charger 22 to work so as to convert the alternating current of the AC power supply Vi into direct current and charge the positive DC bus capacitor C22 and the negative DC bus capacitor C23, so that the voltage across the positive DC bus capacitor C22 and the negative DC bus capacitor C23 is equal to the amplitude of the AC power supply Vi.

Figure 3:
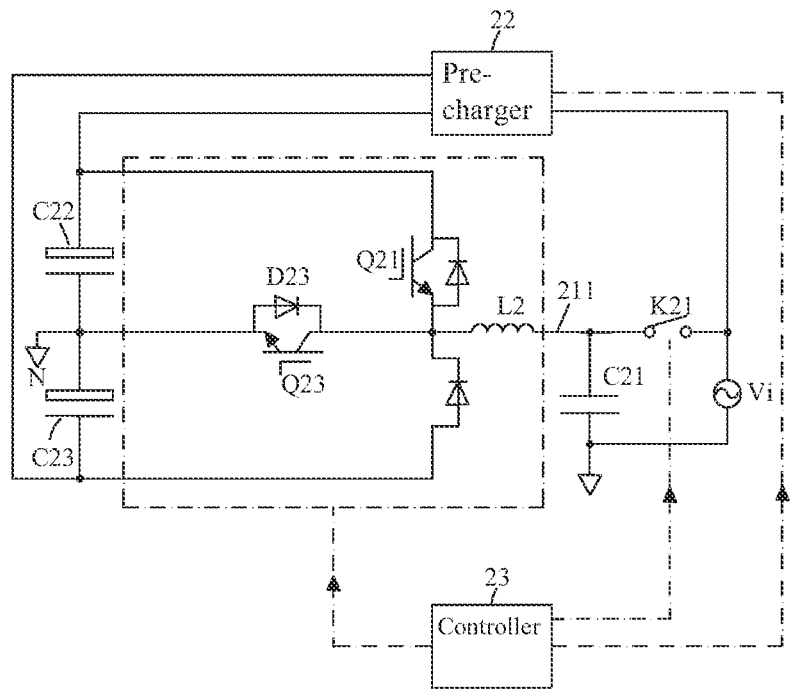
FIG. 3 is an equivalent circuit diagram of the bidirectional DC-AC conversion circuit shown in FIG. 2 during the start-up procedure in the positive half cycle of the AC power supply.

In step S22, the controller 23 controls the pre-charger 22 to stop working, and controls the T-type three-level converter 21 to work so as to invert the voltage across the positive DC bus capacitor C22 and the negative DC bus capacitor C23, so that the AC input 211 of the T-type three-level converter 21 outputs the inverting voltage to the input capacitor C21.

Wherein in the positive half cycle of the AC power supply Vi, the switching transistor Q22 is controlled to turn on, and the switching transistor Q24 is controlled to cut off, and the switching transistors Q21 and Q23 are provided with complementary sinusoidal pulse width modulated signals. FIG. 3 is an equivalent circuit diagram of the bidirectional DC-AC conversion circuit shown in FIG. 2 during the start-up procedure in the positive half cycle of the AC power supply. As shown in FIG. 3, the positive DC bus capacitor C22, the switching transistor Q21, the inductor L2, and the diode D23 connected in parallel in an opposite direction constitute one step-down chopper (buck) circuit, whereby the voltage at the AC input 211 is equal to the product of the voltage across the positive DC bus capacitor C22 and the duty cycle of the pulse width modulated signal of the switching transistor Q21. The switching transistor Q21 is provided with a sinusoidal pulse width modulated signal, so that in the positive half cycle of the AC power supply Vi, the inverting voltage output by the AC input 211 of the T-type three-level converter 21 is the positive half cycle of a sine wave, and the phase and amplitude thereof are the same as the phase and amplitude of the alternating current of the positive half cycle of the AC power supply Vi.

Figure 4:
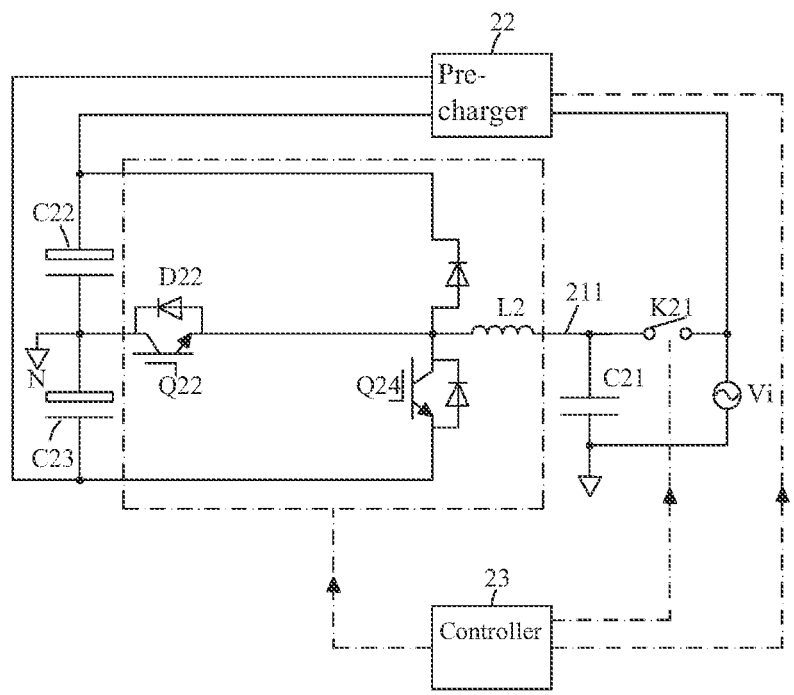
FIG. 4 is an equivalent circuit diagram of the bidirectional DC-AC conversion circuit shown in FIG. 2 during the start-up procedure in the negative half cycle of the AC power supply.

In the negative half cycle of the AC power supply Vi, the switching transistor Q21 is controlled to cut off and the switching transistor Q23 is controlled to turn on, providing complementary sinusoidal pulse width modulated signals to the switching transistors Q22 and Q24. FIG. 4 is an equivalent circuit diagram of the bidirectional DC-AC conversion circuit shown in FIG. 2 during the start-up procedure in the negative half cycle of the AC power supply. As shown in FIG. 4, the negative DC bus capacitor C23, the switching transistor Q24, the inductor L2, and the diode D22 connected in parallel in an opposite direction constitute another Buck circuit, whereby the voltage at the AC input 211 is equal to the product of the voltage across the negative DC bus capacitor C23 and the duty cycle of the pulse width modulated signal of the switching transistor Q24. The switching transistor Q24 is provided with a sinusoidal pulse width modulated signal, so that in the negative half cycle of the AC power supply Vi, the inverting voltage output by the AC input 211 of the T-type three-level converter 21 is the negative half cycle of a sine wave, and the phase and amplitude thereof are the same as the phase and amplitude of the alternating current of the negative half cycle of the AC power supply Vi.

Therefore, the instantaneous value of the inverting voltage across the input capacitor C21 is the same as the instantaneous value of the alternating current of the AC power supply Vi.

In step S23, the switch K21 is controlled to turn on. When the switch K21 is controlled to turn on, since the voltage across the input capacitor C21 is zero, there is no inrush current and the damage to the switch K21 and the input capacitor C21 is avoided. Finally, the start-up procedure of the bidirectional DC-AC conversion circuit 20 is realized.

Figure 5:
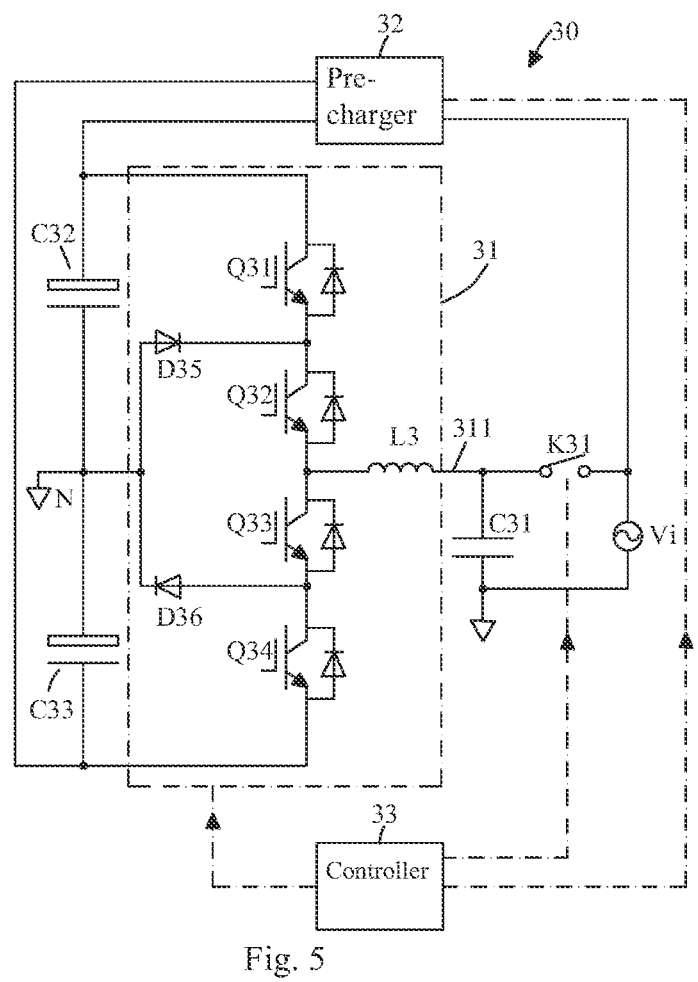
FIG. 5 is a circuit diagram of a bidirectional DC-AC conversion circuit according to a second embodiment of the present invention.

FIG. 5 is a circuit diagram of a bidirectional DC-AC conversion circuit according to a second embodiment of the present invention. As shown in FIG. 5, the bidirectional DC-AC conversion circuit 30 is substantially the same as the bidirectional DC-AC conversion circuit 20 shown in FIG. 2, except that the T-type three-level converter 21 is replaced with an I-type three-level converter 31.

The I-type three-level converter 31 comprises switching transistors Q31, Q32, Q33, and Q34 which are successively connected between the positive terminal of positive DC bus capacitor C32 and the negative terminal of negative DC bus capacitor C33, and a diode D35, a diode D36, and an inductor L3. The positive electrode of the diode D35 and the negative electrode of the diode D36 are connected to a neutral point, the negative electrode of the diode D35 is connected to a node formed by the connection of the switching transistors Q31 and Q32, and the positive electrode of the diode D36 is connected to a node formed by the connection of the switching transistors Q33 and Q34. One end of the inductor L3 is connected to a node formed by the connection of the switching transistors Q32 and Q33, and the other end serves as an AC input 311 of the I-type three-level converter 31.

The start-up procedure of the bidirectional DC-AC conversion circuit 30 will be described below.

In step S31, the controller 33 controls the switch K31 to turn off, and controls the pre-charger 32 to work so as to convert the alternating current of the AC power supply Vi into direct current and charge the positive DC bus capacitor C32 and the negative DC bus capacitor C33, so that the voltage across the positive DC bus capacitor C32 and the negative DC bus capacitor C33 is equal to the amplitude of the AC power supply Vi.

Figure 6:
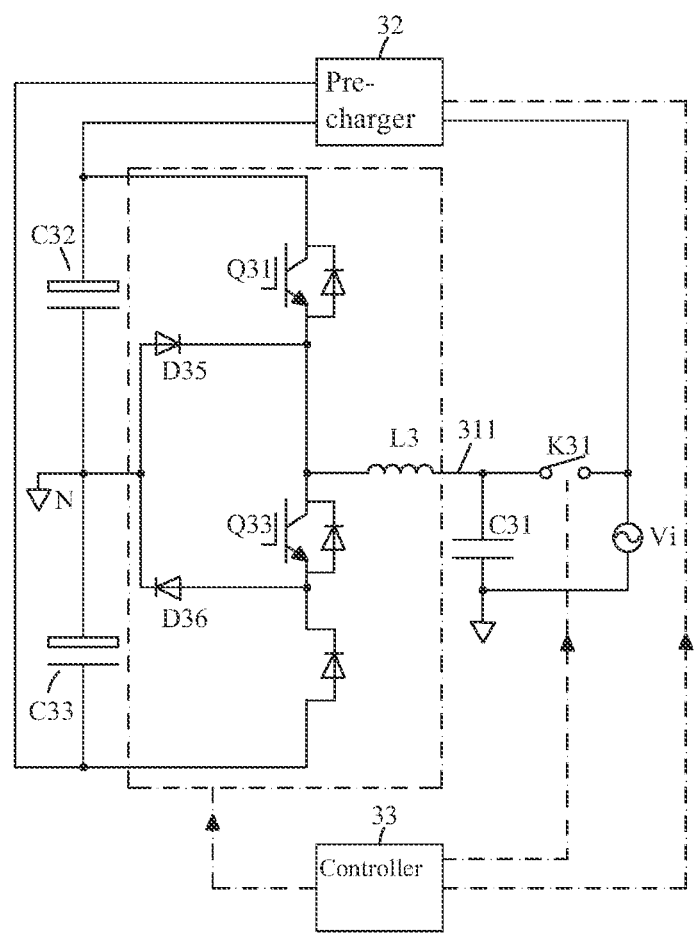
FIG. 6 is an equivalent circuit diagram of the bidirectional DC-AC conversion circuit shown in FIG. 5 during the start-up procedure in the positive half cycle of the AC power supply.

In step S32, the controller 33 controls the pre-charger 32 to stop working, and controls the I-type three-level converter 31 to work so as to invert the voltage across the positive DC bus capacitor C32 and the negative DC bus capacitor C33, so that the AC input 311 of the I-type three-level converter 31 outputs the inverting voltage to the input capacitor C31.

Wherein in the positive half cycle of the AC power supply Vi, the switching transistor Q32 is controlled to turn on, and the switching transistor Q34 is controlled to cut off, and the switching transistors Q31 and Q33 are provided with complementary sinusoidal pulse width modulated signals. FIG. 6 is an equivalent circuit diagram of the bidirectional DC-AC conversion circuit shown in FIG. 5 during the start-up procedure in the positive half cycle of the AC power supply. As shown in FIG. 6, the positive DC bus capacitor C32, the switching transistor Q31, the inductor L3, and the diode D35 constitute one step-down chopper (buck) circuit, whereby the voltage at the AC input 311 is equal to the product of the voltage across the positive DC bus capacitor C32 and the duty cycle of the pulse width modulated signal of the switching transistor Q31. The switching transistor Q31 is provided with a sinusoidal pulse width modulated signal, so that in the positive half cycle of the AC power supply Vi, the inverting voltage output by the AC input 311 of the I-type three-level converter 31 is the positive half cycle of a sine wave, and the phase and amplitude thereof are the same as the phase and amplitude of the alternating current of the positive half cycle of the AC power supply Vi.

Figure 7:
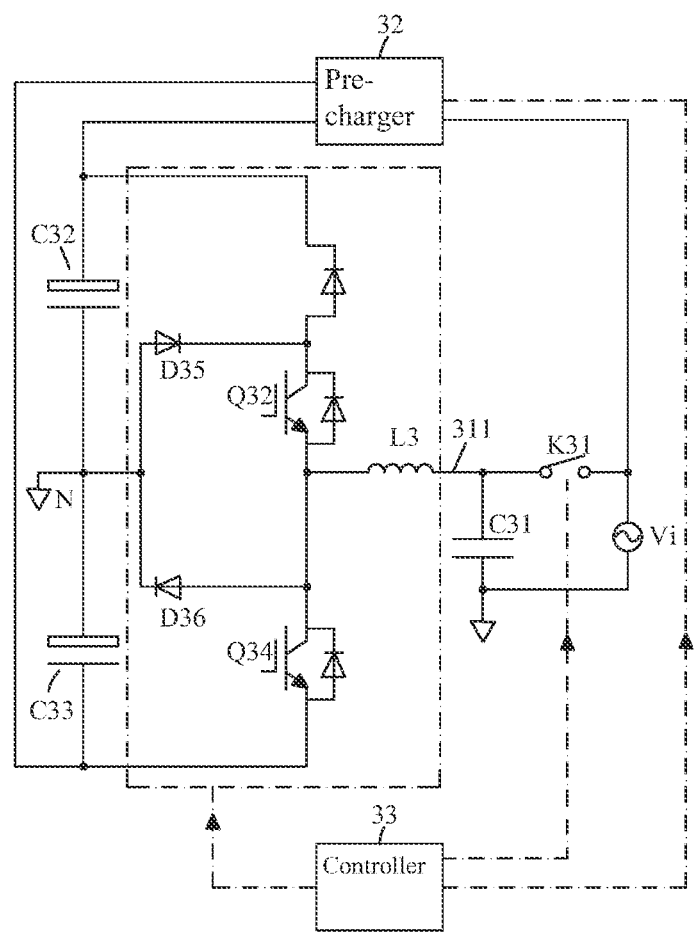
FIG. 7 is an equivalent circuit diagram of the bidirectional DC-AC conversion circuit shown in FIG. 5 during the start-up procedure in the negative half cycle of the AC power supply.

In the negative half cycle of the AC power supply Vi, the switching transistor Q31 is controlled to cut off and the switching transistor Q33 is controlled to turn on, providing complementary sinusoidal pulse width modulated signals to the switching transistors Q32 and Q34. FIG. 7 is an equivalent circuit diagram of the bidirectional DC-AC conversion circuit shown in FIG. 5 during the start-up procedure in the negative half cycle of the AC power supply. As shown in FIG. 7, the negative DC bus capacitor C33, the switching transistor Q34, the inductor L3, and the diode D36 constitute another Buck circuit, whereby the voltage at the AC input 311 is equal to the product of the voltage across the negative DC bus capacitor C33 and the duty cycle of the pulse width modulated signal of the switching transistor Q34. The switching transistor Q34 is provided with a sinusoidal pulse width modulated signal, so that in the negative half cycle of the AC power supply Vi, the inverting voltage output by the AC input 311 of the I-type three-level converter 31 is the negative half cycle of a sine wave, and the phase and amplitude thereof are the same as the phase and amplitude of the alternating current of the negative half cycle of the AC power supply Vi.

Therefore, the instantaneous value of the inverting voltage across the input capacitor C31 is the same as the instantaneous value of the alternating current of the AC power supply Vi.

In step S33, the switch K31 is controlled to turn on. When the switch K31 is controlled to turn on, since the voltage across the input capacitor C31 is zero, there is no inrush current and the damage to the switch K31 and the input capacitor C31 is avoided. Finally, the start-up procedure of the bidirectional DC-AC conversion circuit 30 is realized.

According to other embodiments of the present invention, the controller preferably controls the pre-charger to work such that the voltage across the positive DC bus capacitor or the negative DC bus capacitor is no less than the amplitude of the alternating current of the AC power supply Vi. More preferably, the controller controls the pre-charger so that the voltage of the positive DC bus capacitor or the negative DC bus capacitor is equal to the amplitude of the alternating current of the AC power supply Vi, thereby enabling the pre-charging procedure to be carried out quickly in the first step, and enabling the amplitude of the inverting voltage output by the T-type three-level converter to be equal to the amplitude of the alternating current in the second step, so that the instantaneous value of the voltage across the input capacitor is zero when the switch is turned on in the third step.

In other embodiments of the present invention, the T-type three-level converter 21 or the I-type three-level converter 31 may also be replaced with a bidirectional DC-AC two-level converter which is controlled to convert the alternating current of an AC power supply into direct current and output it to two ends of a bus capacitor. At the start-up, the pre-charger converts the alternating current of the AC power supply into direct current and outputs it to the two ends of the bus capacitor, so that the voltage across the bus capacitor is no less than the peak-to-peak value of the alternating current. And the two-level converter is controlled to invert the direct current on the bus capacitor into an inverting voltage with the same phase and amplitude as the alternating current of the AC power supply and output it to the input capacitor.

The switching transistor in the bidirectional DC-AC converter of the present invention is not limited to an insulated gate bipolar transistor, and may be other switching transistors such as a metal oxide semiconductor field effect transistor.

While the present invention has been described by preferred embodiments, the present invention is not limited to the embodiments described herein. It is intended that the present invention also includes various modifications and variations of the present invention without departing from the scope of the present invention.

The invention claimed is:
1. A converter, comprising:
a bidirectional DC-AC converter circuit;

an input capacitor connected to an AC input of the bidirectional DC-AC converter circuit;
a bus capacitor connected to a DC output of the bidirectional DC-AC converter circuit;
a switch connected between a positive terminal of the input capacitor and an AC power supply;
a pre-charger circuit having an input connected to the AC power supply and an output connected to the DC output of the bidirectional DC-AC converter circuit; and
a controller configured to cause the pre-charger circuit to charge the bus capacitor while the switch is turned off and to cause the bidirectional DC-AC converter circuit to generate an inverting voltage from a voltage across the bus capacitor and apply the inverting voltage to the input capacitor before turning on the switch, wherein a phase of the inverting voltage is the same as a phase of a voltage of the AC power supply and wherein an amplitude of the inverting voltage is equal to an amplitude of the voltage of the AC power supply,
wherein the bus capacitor comprises a positive direct current bus capacitor and a negative direct current bus capacitor and a negative terminal of the positive direct current bus capacitor and a positive terminal of the negative direct current bus capacitor are connected to a neutral point;
wherein the bidirectional DC-AC converter circuit is a three-level converter and a DC output of the three-level converter is connected to a positive terminal of the positive direct current bus capacitor and a negative terminal of the negative direct current bus capacitor; and
wherein the controller is configured to control the pre-charger circuit such that an amplitude of a voltage across the positive direct current bus capacitor or negative direct current bus capacitor is equal to the amplitude of the AC power supply and to control the bidirectional DC-AC converter circuit such that the phase and amplitude of the inverting voltage are equal to the phase and amplitude of the AC power supply, respectively.

2. The converter according to claim 1, wherein an amplitude of the voltage across the bus capacitor is not less than a peak-to-peak value of the voltage of the AC power supply.

3. The converter according to claim 1, wherein the three-level converter is a T-type three-level converter comprising:
a first switching transistor and a fourth switching transistor connected in series between the positive terminal of the positive direct current bus capacitor and the negative terminal of the negative direct current bus capacitor;
a second switching transistor and a third switching transistor connected in series, the second switching transistor being connected to the neutral point; and
an inductor having a first terminal connected to a node connecting the first switching transistor, the third switching transistor, and the fourth switching transistor, and a second terminal used as an AC input of the T-type three-level converter;
wherein the controller is configured to turn on the second switching transistor and turn off the fourth switching transistor in a positive half cycle of the AC power supply to provide a first sinusoidal pulse width modulated signal to the first switching transistor and to provide a second sinusoidal pulse width modulated signal complementary to the first sinusoidal pulse width modulated signal to the third switching transistor and, in a negative half cycle of the AC power supply, to turn off the first switching transistor and turn on the third switching transistor to provide a third sinusoidal pulse width modulated signal to the fourth switching transistor and to provide a fourth sinusoidal pulse width modulated signal complementary to the third sinusoidal pulse width modulated signal to the second switching transistor.

4. The converter according to claim 1, wherein the three-level converter is an I-type three-level converter comprising:
a first switching transistor, a second switching transistor, a third switching transistor, and a fourth switching transistor connected in series between the positive terminal of the positive direct current bus capacitor and the negative terminal of the negative direct current bus capacitor;
a first diode having a negative electrode connected to a node connecting the first switching transistor and the second switching transistor, and a positive electrode connected to the neutral point;
a second diode having a negative electrode connected to the neutral point and a positive electrode connected to a node connecting the third switching transistor and the fourth switching transistor; and
an inductor having a first terminal connected to a node connecting the second switching transistor and the third switching transistor and a second terminal used as an AC input of the I-type three-level converter;
wherein the controller is configured to turn on the second switching transistor and turn off the fourth switching transistor in a positive half cycle of the AC power supply to provide a first sinusoidal pulse width modulated signal to the first switching transistor and to provide a second sinusoidal pulse width modulated signal complementary to the first sinusoidal pulse width modulated signal to the third switching transistor and, in a negative half cycle of the AC power supply, to turn off the first switching transistor and turn on the third switching transistor to provide a third sinusoidal pulse width modulated signal to the fourth switching transistor and to provide a fourth sinusoidal pulse width modulated signal complementary to the third sinusoidal pulse width modulated signal to the second switching transistor.

5. A method of operating a converter including a bidirectional DC-AC converter circuit, an input capacitor connected to an AC input of the bidirectional DC-AC converter circuit, a bus capacitor connected to a DC output of the bidirectional DC-AC converter circuit, a switch connected between a positive terminal of the input capacitor and an AC power supply, and a pre-charger circuit having an input connected to the AC power supply and an output connected to the DC output of the bidirectional DC-AC converter circuit, the method comprising:
using the pre-charger circuit to charge the bus capacitor while the switch is turned off; and
using the bidirectional DC-AC converter circuit to generate an inverting voltage from a voltage across the bus capacitor and apply the inverting voltage to the input capacitor before turning on the switch, wherein a phase of the inverting voltage is the same as a phase of the AC power supply and wherein an amplitude of the inverting voltage is equal to the amplitude of the AC power supply,
wherein the bus capacitor comprises a positive direct current bus capacitor and a negative direct current bus capacitor and a negative terminal of the positive direct current bus capacitor and a positive terminal of the negative direct current bus capacitor are connected to a neutral point;

wherein the bidirectional DC-AC converter circuit is a three-level converter and a DC output of the three-level converter is connected to a positive terminal of the positive direct current bus capacitor and a negative terminal of the negative direct current bus capacitor;

wherein in step 1), the voltage across the positive direct current bus capacitor or the negative direct current bus capacitor is made equal to the amplitude of the AC power supply; and wherein in step 2), the phase and amplitude of the inverting voltage are made equal to the phase and amplitude of the AC power supply, respectively.

6. The method according to claim 5, wherein the voltage of the bus capacitor is not less than a peak-to-peak value of the voltage of the AC power supply.

7. The method according to claim 5, wherein the three-level converter is a T-type three-level converter comprising:
   a first switching transistor and a fourth switching transistor connected in series between the positive terminal of the positive direct current bus capacitor and the negative terminal of the negative direct current bus capacitor,
   a second switching transistor and a third switching transistor connected in series, the second switching transistor being connected to the neutral point, and
   an inductor having a first terminal connected to a node connecting the first switching transistor, the third switching transistor, and the fourth switching transistor and a second terminal used as an AC input of the T-type three-level converter;
   wherein the step 2) comprises: in a positive half cycle of the AC power supply, turning on the second switching transistor and turning off the fourth switching transistor to provide a first sinusoidal pulse width modulated signal to the first switching transistor and to provide a second sinusoidal pulse width modulated signal complementary to the first sinusoidal pulse width modulated signal to the third switching transistor; in a negative half cycle of the AC power supply, turning off the first switching transistor and turning on the third switching transistor to provide a third sinusoidal pulse width modulated signal to the fourth switching transistor and to provide a fourth sinusoidal pulse width modulated signal complementary to the third sinusoidal pulse width modulated signal to the second switching transistor.

8. The method to claim 5, wherein the three-level converter is an I-type three-level converter comprising:
   a first switching transistor, a second switching transistor, a third switching transistor, and a fourth switching transistor connected in series between the positive terminal of the positive direct current bus capacitor and the negative terminal of the negative direct current bus capacitor;
   a first diode having a negative electrode connected to a node connecting the first switching transistor and the second switching transistor and a positive electrode connected to the neutral point;
   a second diode having a negative electrode connected to the neutral point and a positive electrode connected to a node connecting the third switching transistor and the fourth switching transistor; and
   an inductor having a first terminal connected to a node connecting the second switching transistor and the third switching transistor and a second terminal used as the AC input of the I-type three-level converter;
   wherein the step 2) comprises: in a positive half cycle of the AC power supply, turning on the second switching transistor and turning off the fourth switching transistor to provide a first sinusoidal pulse width modulated signal to the first switching transistor and to provide a second sinusoidal pulse width modulated signal complementary to the first sinusoidal pulse width modulated signal to the third switching transistor; in a negative half cycle of the AC power supply, turning off the first switching transistor and turning on the third switching transistor to provide a third sinusoidal pulse width modulated signal to the fourth switching transistor and to provide a fourth sinusoidal pulse width modulated signal complementary to the third sinusoidal pulse width modulated signal to the second switching transistor.

* * * * *